United States Patent [19]
Röttger

[11] Patent Number: 4,738,561
[45] Date of Patent: Apr. 19, 1988

[54] DEVICE FOR PROTECTING WHEEL DISCS SHRINK-FITTED ON SHAFTS AGAINST ROTATION RELATIVE TO THE SHAFTS AND METHOD FOR MANUFACTURING THE SAME

[75] Inventor: Gerhard Röttger, Mülheim, Fed. Rep. of Germany

[73] Assignee: Kraftwerk Union Aktiengesellschaft, Mülheim, Fed. Rep. of Germany

[21] Appl. No.: 797,449

[22] Filed: Nov. 13, 1985

[30] Foreign Application Priority Data

Nov. 13, 1984 [DE] Fed. Rep. of Germany ....... 3441457

[51] Int. Cl.⁴ .............................................. F16B 4/00
[52] U.S. Cl. .................................... 403/273; 403/351; 403/365
[58] Field of Search .................. 403/273, 365, 351, 24, 403/352; 285/381

[56] References Cited

U.S. PATENT DOCUMENTS

| | | | |
|---|---|---|---|
| 576,665 | 2/1897 | Farrar | 403/351 |
| 2,919,940 | 1/1960 | Anderson | 403/365 |
| 3,077,334 | 2/1963 | Rubio et al. | 416/244 R |
| 4,417,855 | 11/1983 | Jepsen | 403/365 X |
| 4,602,411 | 7/1986 | Brown | 403/273 X |

Primary Examiner—Andrew V. Kundrat
Attorney, Agent, or Firm—Herbert L. Lerner; Laurence A. Greenberg

[57] ABSTRACT

A wheel disc and shaft assembly for protecting wheel discs shrink-fitted on shafts against rotation relative to the shafts includes a shaft with an outer peripheral surface at a section thereof, a wheel disc having a hub with lateral surfaces and with an inner peripheral surface with a given diameter shrink-fitted on the outer peripheral surface of the shaft, at least one of the lateral surfaces having an annular chamber formed therein defining a peripheral surface eccentric to the center of the shaft, a filling assembly fitted in the chamber and secured to the wheel disc against rotation relative to the wheel disc, the filling ring assembly having an inner peripheral surface shrink-fitted on the outer peripheral surface of the shaft, the inner peripheral surface of the filling ring assembly being axially adjacent the inner peripheral surface of the hub and having a diameter substantially equal to the given diameter, and means disposed between the inner peripheral surface of the filling ring assembly and the outer peripheral surface of the shaft for frictionally locking the wheel disc to the shaft, and a method for manufacturing the same.

2 Claims, 2 Drawing Sheets

DEVICE FOR PROTECTING WHEEL DISCS SHRINK-FITTED ON SHAFTS AGAINST ROTATION RELATIVE TO THE SHAFTS AND METHOD FOR MANUFACTURING THE SAME

The invention relates to a device for protecting wheel discs shrink-fitted on shafts against rotation relative to the shafts, especially in low-pressure turbine rotors of saturated-steam turbo sets, including at least one wheel disc with a hub having an inner peripheral seating surface shrink-fitted on the outer peripheral surface of a shaft section, and form-locking connections securing a frictional locking between the disc and the shaft.

The invention also relates to a method of manufacturing such a rotation protection device.

The wheel discs of so-called disc rotors of large machines which are shrink-fitted on shafts must be protected against rotation. In particular, this involves the wheel discs of turbo machine rotors and low-pressure turbine rotors of so-called saturated-steam turbo sets, which are turbo sets for nuclear power generating stations, the rotors of which revolve at 1500 RPM overall or at least at their low-pressure turbine rotors. The rotors of the low-pressure turbine sections are not made of one piece because of the large overall volume, but the individual wheel discs which are provided with the rotor blade rims are shrink-fitted on the shaft, i.e., on appropriate seating surfaces of the shaft. Considerable torques attack the blades of the shrink-fitted-on wheel discs during operation due to steam forces, which must be transmitted through the shrink-seat surfaces to the shaft and by the shaft to the coupled-on generator rotor. As an additional protection, the boundary surfaces between the inner periphery of the wheel discs and the outer periphery of the shaft are provided with rotation protection devices, especially axial rotation protection devices distributed over the periphery of the shaft. For instance, axial blind holes may be drilled from the free end face or lateral surface of the wheel disc after the respective wheel disc is shrink-fitted on, the pitch circle thereof agreeing with the boundary surface contour. Axial pins are then driven into the rotation protection holes; for instance, five axial torsion protection devices uniformly distributed over the periphery may be used. The seating surface area of the axial rotation protection pins or bolts must be examined at regular intervals for material integrity as far as the adjacent wheel disc material is concerned, so that possibly occurring faults due to the notch effect can be recognized.

It is an object of the invention to provide a device for protecting wheel discs shrink-fitted on shafts against rotation, which overcomes the hereinafore-mentioned disadvantages of the heretofore-known devices of this general type, and to do so in such a manner that the inner periphery of the wheel discs is kept free of recesses for axial rotation protection devices in the form of axial drill holes or key slots for receiving corresponding axial bolts or keys or the like, and the notch effect on the inner peripheral portions of the wheel disc hub is reduced thereby. With the foregoing and other objects in view there is provided, in accordance with the invention, a wheel disc and shaft assembly for protecting wheel discs shrink-fitted on shafts against rotation, especially discs on low-pressure turbine rotors of saturated-steam turbo sets, comprising a shaft with an outer peripheral surface at a section thereof, at least one wheel discs having a hub with lateral surfaces or end faces and with an inner peripheral seating surface with a given diameter shrink-fitted on the outer peripheral surface of the shaft, at least one of the lateral surfaces having an annular chamber formed therein defining a peripheral surface eccentric to the center of the shaft, a filling assembly fitted in and matched to the chamber and secured to the wheel discs against rotation, the filling ring assembly having an inner peripheral surface shrink-fitted on the outer peripheral surface of the shaft, the inner peripheral surface of the filling ring assembly being axially adjacent the inner peripheral seating surface of the hub and having a diameter cut down to be substantially equal to the given diameter, and means disposed between the inner peripheral surface of the filling ring assembly and the outer peripheral surface of the shaft for frictionally locking and form-lockingly connecting the wheel disc to the shaft.

In accordance with another feature of the invention, the filling ring assembly is shrink-fitted into the chamber or vice versa.

In accordance with a further feature of the invention, the filling ring assembly is a one-piece asymmetric ring fitted in the chamber having an outer peripheral surface being eccentric to the inner peripheral surface thereof.

In accordance with an added feature of the invention, the filling ring assembly includes at least two filling ring pieces forming a self-enclosed arch prestressed under pressure in the chamber.

In accordance with an additional feature of the invention, the filling ring pieces are two sickle or crescent-shaped pieces and have parting gaps therebetween, the filling ring assembly having an outer circumferential angle larger than $\pi$ and a dividing secant passing through the parting gaps and intersecting the center of the shaft.

In accordance with again another feature of the invention, the annular chamber is divided into chamber sections, the filling ring pieces are disposed in pairs each having two diametrically opposite sickle or crescent-shaped pieces, all of the pieces being joined together forming a quadrupole arc, each of the pieces being disposed in a separate corresponding one of the chamber sections.

In accordance with again a further feature of the invention, the locking means are in the form of axial rotation protection pins having pitch circles disposed in axial blind holes formed in the outer peripheral seating surface of the shaft and in the inner peripheral surface of the filling ring assembly.

The advantages attainable with the invention are primarily seen in the fact that the notch effect on the inner periphery of the wheel disc hub is substantially decreased as compared with conventional anti-rotation protection devices; the stress concentration factor of the notch $\alpha_K$ is approximately 1 as compared with conventional torsion protection devices which work with pin holes or key slots at the wheel discs and have a stress concentration factor $\alpha_K$ which is about 2 to 3. The stress corrosion sensitivity can therefore be reduced. Furthermore, the inspection effort can be reduced, since the ultrasonic testing of pin hole boundary surfaces at the wheel disc hubs as well as of adjacent portions, requires special test transducer and a difficult testing procedure. Possible flaws at the filling ring assembly are not critical because the filling ring assembly is fully functional in the divided condition.

In accordance with the objects of the invention, there is also provided a method of manufacturing a wheel disc and shaft assembly for protecting wheel discs shrink-fitted on shafts against axial rotation, which comprises cutting an eccentric chamber into a lateral surface of a hub of a wheel disc, forming a filling ring assembly with an outer peripheral surface having a diameter being greater than the diameter of the peripheral surface of the chamber by a desired shrinkage stress distance, heating the wheel disc to a shrinking temperature, inserting the filling ring assembly into the chambers as a closed assembly, shrinking the filling ring assembly by cooling the wheel disc, adapting the diameter of the inner peripheral surface of the filling ring assembly to the diameter of the inner peripheral surface of the hub, simultaneously shrinking the wheel disc with the filling ring assembly onto the outer peripheral seating surface of a section of a shaft, forming axial rotation protection holes in the outer peripheral heating surface of the shaft and in the inner peripheral surface of the filling ring assembly, and driving axial rotation protection pins into the holes.

In accordance with another mode of the invention, there is provided a method which comprises forming the filling ring assembly in one or a plurality of parts.

In accordance with a further mode of the invention, there is provided a method which comprises machining exposed end surfaces of the filling ring assembly.

In accordance with an added mode of the invention, there is provided a method which comprises heating the wheel disc after shrinking onto the peripheral seating surface of the shaft, rotating the wheel disc by a small angle relative to the filling ring assembly after heating, and cooling the rotated wheel disc, for anticipating slippage between the shaft and the wheel disc at the eccentric peripheral surface of the chamber and the eccentric outer peripheral surface of the filling ring assembly caused by an accidental load.

In accordance with a concomitant mode of the invention, there is provided a method which comprises heating the wheel disc inductively.

Other features which are considered to be characteristic for the invention are set forth in the appended claims.

Although the invention is illustrated and described herein as embodied in a device for protecting wheel discs shrink-fitted on shafts against torsion, and method for manufacturing the same, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
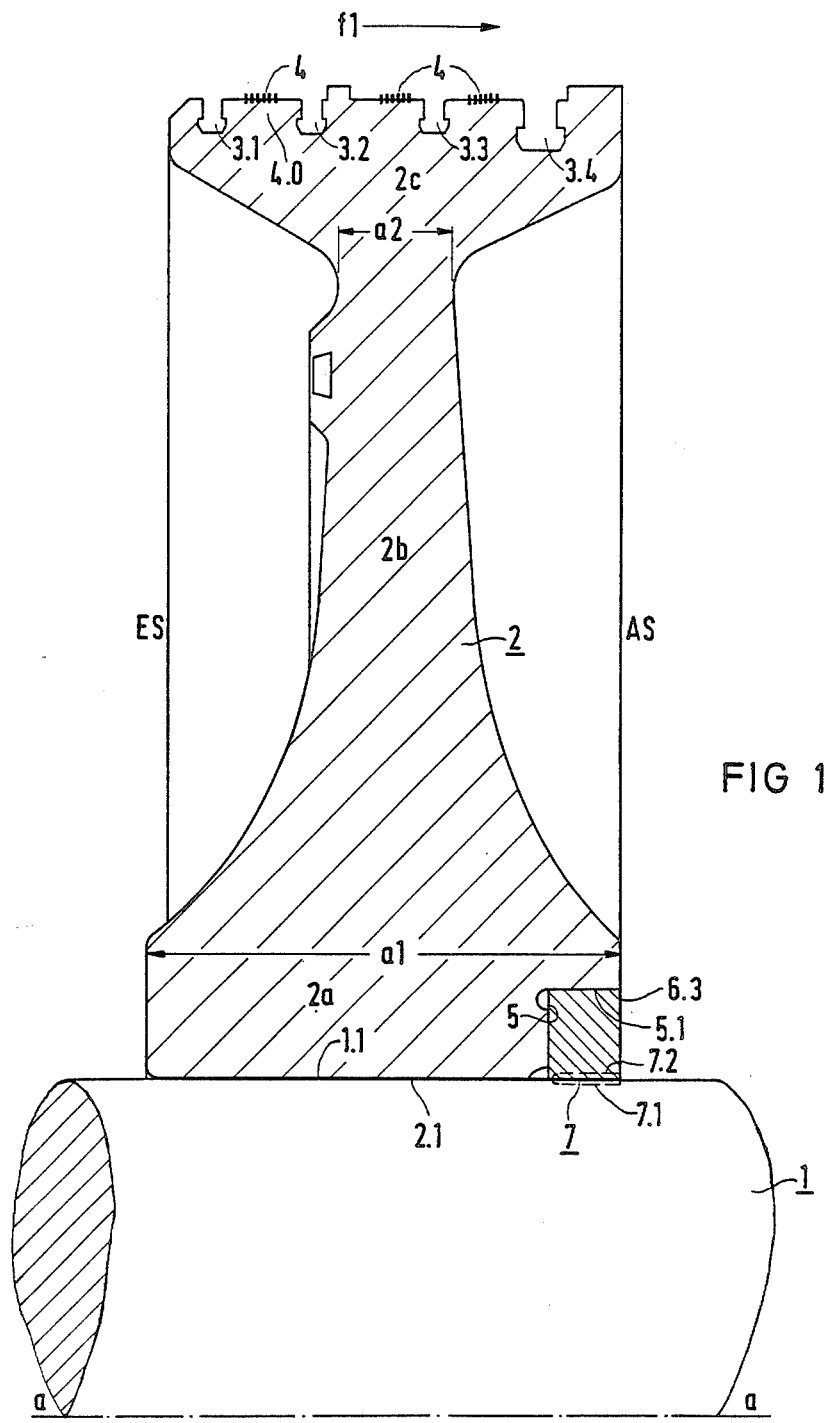
FIG. 1 is a fragmentary, diagrammatic, partly axial cross-sectional view of the upper half of a wheel disc shrink-fitted onto a steam turbine shaft, with an inserted filling ring as- sembly.
Figure 2:
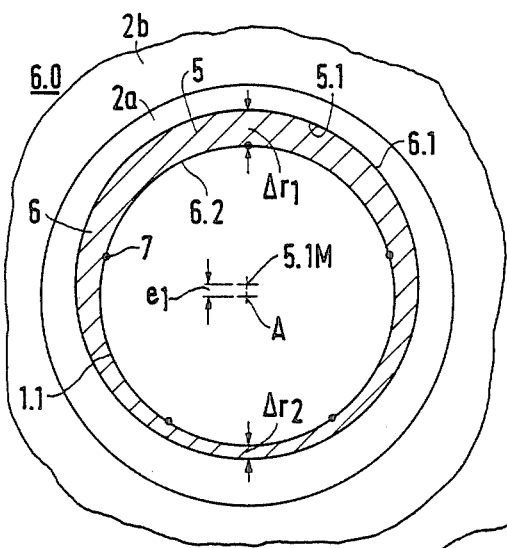
FIG. 2 is a fragmentary, partially cross-sectional view normal to the axis of the shaft, showing a first embodiment of the device with a one-piece filling ring.
Figure 3:
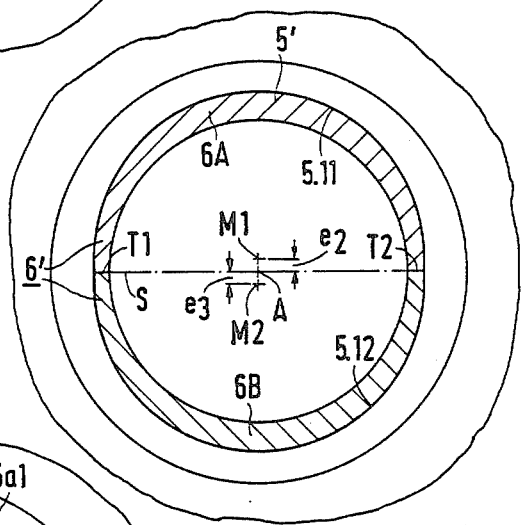
Figure 4:
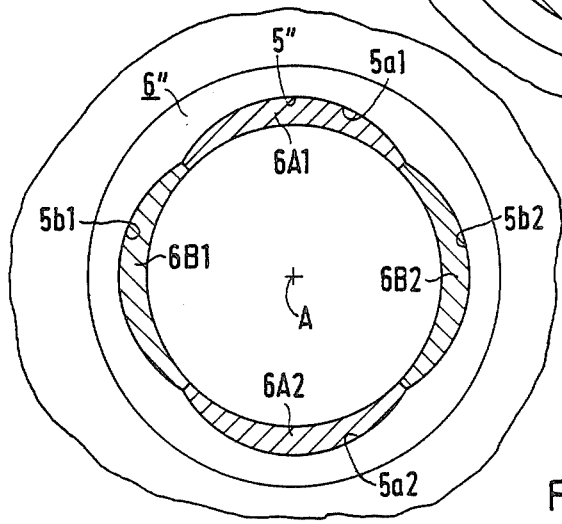

FIG. 3 is a view similar to FIG. 1 of a second embodiment of the device with a filling ring assembly divided into two filling ring halves by an axial parting gap; and FIG. 4 is another view similar to FIG. 2 of a third embodiment of the device with a filling ring assembly divided four ways and accordingly with four parting gaps, wherein, as in FIG. 3, the filling ring pieces form an arch which is closed within itself and is prestressed under pressure.

Referring now to the figures of the drawings in detail and first, particularly, to FIG. 1 thereof, there is seen a wheel disc 2 of a low-pressure turbine rotor which is not shown in detail. The wheel disc 2 is shrink-fitted onto a shaft section 1.1 of a shaft 1 having a shaft axis a—a. The shrink seat surfaces of the wheel disc 2 which coincide with the inner peripheral hub surfaces, are designated with reference numeral 2.1. These shrink seat surfaces 2.1 can also be distributed over partial axial regions of the inner periphery of the hub. The wheel disc 2 is formed of an inner hub part 2a, an outer wheel rim 2c and a disc part 2b connecting the hub part 2a to the wheel rim 2c. For strength reasons, the disc part 2b is substantially gradually tapered in a beam shape from the greatest axial length a1 of its base region adjoining the hub part 2a to a substantially smaller axial dimension a2 which adjoins the wheel rim 2c. The outer periphery of the wheel rim is provided with four circular or ring slots 3.1–3.4 for receiving blade rings. The individual blades are provided with hammer-head profiled blade bases shaped in accordance with the contour of the ring slot. The flow direction of the steam is indicated by an arrow f1. In this expansion direction, the specific volume of the steam increases and therefore the steam passage cross sections and the blade lengths also increase, so that the ring slot 3.4 has a cross section which is enlarged in comparison with the cross section of the preceding ring slots 3.1, 3.2, 3.3. Circular shoulders which remain between the ring slots and are designated as a whole with reference numeral 4.0 are provided with jointing rings or sealing bands 4 which are peened into corresponding circular receiving slots which form axial labyrinth seals together with directly oppositely disposed shroud or cover bands of the non-illustrated guide vane diffusor or ring.

The outside diameter of the wheel disc 2 is about 2910 mm, the inside diameter thereof is about 1140 mm and the axial length $a_1$ thereof is about 430 mm. The shrink seats of such large wheel disc masses which are formed of a steel alloy like the shaft 1, must be protected against rotation. According to the invention, for this purpose the wheel disc hub 2a is provided at the discharge end face or lateral surface AS thereof (the opposite inflow end face or lateral surface being designated ES) with an annular chamber 5, the peripheral surface 5.1 of which is eccentric to the axis a-a, as shown in FIG. 2. The shaft center point of the annular peripheral surface 5.1 which is eccentric relative to the shaft center A is designated in FIG. 2 with reference symbol 5.1 M. It is seen that due to the eccentricity $e_1$ of the center 5.1 M relative to the shaft center A, the chamber 5 has its largest radial dimension $\Delta r_1$, at its upper region and its smallest radial dimension $\Delta r_2$ at its lower region. The filling ring assembly, generally designated with reference numeral 6.0, is in the form of a filling ring 6 which is fitted into the chamber 5, is connected to the wheel disc 2 and is protected against torsion. The torsion-proof connection between the parts 6 and 2, i.e., between the boundary or inner peripheral surface 5.1 of the wheel disc and the outer ring or peripheral surface 6.1 of the filling ring assembly, is in the form of a shrink connection which is particularly advantageous. For the embodiment according to FIG. 2, this means that the one-piece filling ring 6 with its outer peripheral surface 6.1 is slightly oversized relative to the inner peripheral surface 5.1 of the chamber 5. If the entire wheel disc or at least its hub region 2a is heated to the shrinking temperature and the filling ring 6 is inserted into the chamber 5 which is enlarged by heating in this manner, then when the wheel disc 2 is cooled down, the ring 6 is unequivocally fixed within the chamber 5 by a shrink fit between the boundary or peripheral surfaces 6.1 and 5.1 and is secured against rotation.

The eccentric recess or chamber 5 according to FIGS. 1 and 2 is advantageously machined on a lathe by working the wheel disc while it is clamped eccentrically in a vertical boring mill.

The wheel disc which is equipped with its filling ring 6 can then be clamped again into a turning machine, in which the inner periphery of the filling ring 6 is turned down exactly to the inner peripheral dimension of the shrink fit surface 2.1 which remains at the wheel disc borehole. The wheel disc 2 with the shrink-fitted ring 6 prepared in this manner can then be heated together to the shrinking temperature and subsequently shrink-fitted onto its shaft seat. Subsequently, the axial rotation protection devices, which are designated as a whole with reference numeral 7, are mounted. FIG. 2 shows five of such devices uniformly distributed over the periphery of the shaft. To this end, holes 7.1 which may be 20 mm in diameter and slightly over 80 mm deep are formed in the boundary surfaces between the inner peripheral surface 6.2 of the filling ring 6 and the outer peripheral surface 1.1 of the shaft 1, so that an approximately semicircular recess portion of the rotation protection hole is located in each of the filling ring 6 and the adjacent portion of the shaft surface. Such an axial rotation protection device is indicated by broken lines in FIG. 1 at reference numeral 7. After drilling, the axial pins 7.2 are then driven with a close fit into the axial torsion protection holes 7.1. This produces a form-locking connection between the shaft and the disc. A form-locking connection is one in which parts are interconnected by virtue of their shape, without requiring external force.

In order to shrink the filling ring 6, in principle it would also be possible to heavily undercool the ring, to insert it into its chamber and to then establish the shrink fit by reheating to room temperature. However, heating the wheel disc portions surrounding the filling ring 6 is more advantageous because a greater amount of shrinkage is obtained.

In the embodiment example according to FIG. 3, the filling ring assembly 6.0 is formed of two filling ring pieces 6A (upper ring part) and 6B (lower ring part) which form a closed arch 6' that is prestressed under pressure and the outer circumferential arc measurement of which is somewhat greater than $\pi$ because of eccentricities $e_2$, $e_3$.

As may be seen from FIG. 3, the cross sections of the two ring halves 6A, 6B are approximately crescent or sickle-shaped and their dividing secant S which runs through parting gaps T1, T2 passes through the shaft center A or the shaft axis a—a. In FIG. 3 the outer contour of the chamber 5' is formed by two semicircles 5.11 and 5.12, the respective centers M1 and M2 of which have the eccentricity $e_2$ and $e_3$ relative to the shaft center A. The outer contour of the chamber 5' is therefore elliptical; however, it is mirror-symmetrical relative to the secant S which acts as the axis of symmetry, as is the top view of the two crescent or sickle-shaped ring halves 6A and 6B, which might be called concave-convex. In contrast thereto, the filling ring 6 in the first embodiment according to FIG. 2, is asymmetrical, as already explained. The axial rotation protection devices 7 are not shown in FIG. 3 or FIG. 4 for simplification.

The embodiment of FIG. 4 shows a device which is formed of two pairs of diametrically opposite filling pieces in the form of crescents or sickles 6A1, 6A2 and 6B1, 6B2 which are joined together to form an arc structure 6" in a quadrupole assembly. These four filling ring pieces are inserted into corresponding chamber sections 5a1, 5a2, 5b1, 5b2 of the annular chamber assembly, i.e., are shrink-fitted in as described. The ring 6 according to FIG. 2 or the ring sections according to FIGS. 3 and 4 are likewise made by turning on a lathe and, in the case of ring sections according to FIG. 3, they are obtained by cutting apart two full rings, specifically into a larger and a smaller ring section, the larger if which is used. In the embodiment according to FIG. 4, a full ring would be required for each filling ring quarter, the smaller arc section of which would be used.

In the embodiments according to FIGS. 3 and 4, lathe machining is also performed after shrinking down to the dimension of the inner periphery of the wheel disc. The magnitude of the ring eccentricities $e_1$, $e_2$, $e_3$ (this eccentricity is not designated separately in the third embodiment according to FIG. 4) as well as the number of ring sections depend on the magnitude of the torque to be transmitted and the size of the small slippage occurring between the wheel disc 2 and the shaft 1 permitted by the manufacturer in the event of an accidental overspeed. However, this slippage can be anticipated by suitable processing steps before the rotor is set in operation, as will be explained below. For larger torques, several ring sections must be provided since the forces acting transversely to the shaft 1 in the filling ring plane are thereby compensated. It should be added that the filling pieces 6A, 6B, 6A1 etc. can also be made from forged arc blanks. It can be seen from the above, that according to the invention, an advantageous method for manufacturing the above-described device can also be provided, which is chacaterized by the following process steps:

(a) Cutting the eccentric chamber 5, 5', 5" into the wheel disc 2;

(b) forming the one-part or multiple-part filling ring assembly 6.0 oversized with its outer peripheral surface 6.1 corresponding to the desired shrinkage stress, relative to the peripheral surfaces 5.1 of the chamber 5;

(c) heating the wheel disc 2 to the shrinking temperature and inserting the filling ring 6 or the multiple-part filling ring assembly 6.0 as a closed assembly;

(d) shrinking the filling ring assembly by cooling the wheel disc;

(e) reworking the inner peripheral surface 6.2 of the filling ring assembly 6.0 by cutting it down to the dimension of the remaining inner periphery of the hub or shrink fit surface 2.1 and, if required, reworking the free end faces of the filling ring assembly 6.0;

(f) jointly shrinking of the wheel disc 2 provided with the filling ring assembly 6.0 onto the outer peripheral seating surfaces 1.1 of their shaft section; as well as (g) working the axial torsion prevention holes 7.1 into the boundary surface region between the shaft 1 and the filling ring assembly 6.0 and driving in the axial torsion protection pins 7.2.

For larger torque loads, it is advisable as a further process step to anticipate the slippage occurring between the shaft 1 and the wheel disc 2 at the eccentric boundary surfaces in the event of an accidental load, by rotating the completely assembled wheel disc which may be inductively heated, by a small angle relative to its filling ring assembly 6.0 and by cooling down the wheel disc in this rotated condition.

The foregoing is a description corresponding in substance to German Application P 34 41 457.6, dated Nov. 13, 1984, the International priority of which is being claimed for the instant application, and which is hereby made part of this application. Any material discrepancies between the foregoing specification and the aforementioned corresponding German application are to be resolved in favor of the latter.

I claim:

1. Wheel disc and shaft assembly for protecting wheel discs shrink-fitted on shafts against rotation relative to the shafts, comprising a shaft with an outer peripheral surface at a section thereof, a wheel disc having a hub with lateral surfaces and with an inner peripheral surface with a given diameter shrink-fitted on said outer peripheral surface of said shaft, at least one of said lateral surfaces having an annular chamber formed therein defining a peripheral surface eccentric to the center of said shaft, an eccentric filling ring assembly fitted in said chamber and secured to said wheel disc against rotation relative to said wheel disc, said filling ring assembly having an inner peripheral surface shrink-fitted on said outer peripheral surface of said shaft, said inner peripheral surface of said filling ring assembly being axially adjacent said inner peripheral surface of said hub and having a diameter substantially equal to said given diameter, and means disposed between said inner peripheral surface of said fillig ring assembly and said outer peripheral surface of said shaft for frictionally locking said wheel disc to said shaft, said filling ring assembly including at least two filling ring pieces forming a self-enclosed arch prestressed under pressure in said chamber, said filling ring pieces being two crescent shaped pieces having parting gaps therebetween, and said filling ring assembly having an outer circumferential angle larger than $\pi$ and a dividing secant passing through said parting gaps and intersecting the center of said shaft.

2. Wheel disc and shaft assembly for protecting wheel discs shrink-fitted on shafts against rotation relative to the shafts, comprising a shaft with an outer peripheral surface at a section thereof, a wheel disc having a hub with a lateral surfaces and with an inner peripheral surface with a given diameter shrink-fitted on said outer peripheral surface of said shaft, at least one of said lateral surfaces having an annular chamber formed therein defining a peripheral surface eccentric to the center of said shaft, said annular chamber being divided into chamber sections, an eccentric filling ring assembly fitted in said chamber and secured to said wheel disc against rotation relative to said wheel disc, said filling ring assembly having an inner peripheral surface shrink-fitted on said outer peripheral surface of said shaft, said inner peripheral surface of said filling ring assembly being axially adjacent said inner peripheral surface of said hub and having a diameter substantially equal to said given diameter, and means disposed between said inner peripheral surface of said filling ring assembly and said outer peripheral surface of said shaft for frictionally locking said wheel disc to said shaft, said filling ring assembly including at least two filling ring pieces forming a self-enclosed arch prestressed under pressure in said chamber, said filling ring pieces being disposed in pairs each having two diametrically opposite crescent shaped pieces, all of said pieces being joined together forming a quadrupole arch, and each of said pieces being disposed in a separate corresponding one of said chamber sections.

* * * * *